United States Patent
Saeki

[11] Patent Number: 5,924,208
[45] Date of Patent: Jul. 20, 1999

[54] CUTTER BLADE RETAINING PLATE STRUCTURE

[75] Inventor: Kenji Saeki, Hino, Japan

[73] Assignee: Kioritz Corporation, Tokyo, Japan

[21] Appl. No.: 09/000,974

[22] Filed: Dec. 30, 1997

[30] Foreign Application Priority Data

Jan. 10, 1997 [JP] Japan .................. 52-14463

[51] Int. Cl.[6] .................. B23D 45/16; B24D 17/00; F16B 9/02

[52] U.S. Cl. .................. 30/388; 30/339; 30/122; 451/508; 403/3; 403/261; 83/698.41

[58] Field of Search .................. 30/388, 390, 122, 30/339, 344, 337; 451/359, 361, 420, 470, 508, 509; 125/20, 15; 83/665, 660, 698, 41, 698.51, 699.51; 403/3, 4, 260, 261, 256

[56] References Cited

U.S. PATENT DOCUMENTS

| | | | |
|---|---|---|---|
| 1,459,683 | 6/1923 | Norris | 83/666 |
| 2,172,407 | 9/1939 | Ramey | 451/339 X |
| 2,540,793 | 2/1951 | Metzger | 125/15 |
| 2,854,042 | 9/1958 | Robinson | 83/666 |
| 2,912,021 | 11/1959 | Gommel | 83/665 |
| 3,334,448 | 8/1967 | Alexander | 451/359 |
| 3,353,306 | 11/1967 | Seymour et al. | 83/665 X |
| 4,326,361 | 4/1982 | McGill | 83/666 X |
| 4,393,626 | 7/1983 | Schroer | 83/666 X |
| 4,657,428 | 4/1987 | Wiley | 30/388 X |
| 5,090,126 | 2/1992 | Higgins | 30/388 |
| 5,319,886 | 6/1994 | Steere, Jr. | 83/666 X |
| 5,733,183 | 3/1998 | Schierling et al. | 451/508 |

FOREIGN PATENT DOCUMENTS

| | | | |
|---|---|---|---|
| 0060971 | 9/1982 | European Pat. Off. | 30/388 |
| 707611 | 4/1931 | France | 83/666 |
| 1289292 | 2/1969 | Germany | 30/388 |

*Primary Examiner*—Rinaldi I. Rada
*Assistant Examiner*—Boyer Ashley
*Attorney, Agent, or Firm*—Michael D. Bednarek; Crowell & Moring LLP

[57] ABSTRACT

A cutter blade retaining plate having a fitting hole to be used for attachment onto a drive shaft in its center position, in which, on both sides of the fitting hole, a boss portion is provided to which cutter blades having different diameters may be fitted. The various cutter blades, each having a different diameter fitting hole, can be easily attached to the drive shaft by changing the orientation of the cutter blade retaining plate or by pressably sliding the blade onto the boss portion, thereby compressing a moveable boss portion. The invention thus eliminates the need for use of differing collars with cutter blades having differing diameter fitting holes, thereby also reducing the incidence of loss of the collars.

6 Claims, 5 Drawing Sheets

CUTTER BLADE RETAINING PLATE STRUCTURE

FIELD OF THE INVENTION

The present invention relates to a cutter blade retaining plate structure, and in particular to a structure that fits a plurality of cutter blade fitting hole diameters for suitable fitting to drive shafts of such devices as motorized cutters having engines or electric motor cutters used for cutting of various materials.

BACKGROUND

Conventionally, motorized cutters having engines ("engine cutters"), electric motor cutters, and the like are used for cutting various materials. In the conventional engined cutter, a cutter blade is attached to a drive shaft that is adapted to be rotated by a motor, such as a small air-cooled two cycle gasoline engine. FIG. 1 presents a typical rotating disc-shaped cutter blade 2 held by an arm 1a extending from an apparatus body 1.

The cutter blade 2 may be replaced with a resinoid blade, powder blade, diamond blade, etc., depending on the materials to be cut. However, in some cases the cutter blade may have a fitting hole with a diameter that differs from that of the cutter, such that the cutter blade 2 cannot be attached to the drive shaft of the cutter. To allow use of the cutter with these types of blades, in the prior art, several collars may be used, each having a different diameter, which are designed to be placed between the drive shaft of the engine cutter 1 and the cutter blade 2 when installed. Typically, the diameters of the fitting holes of such conventional cutter blades are 25.4 mm, 27 mm and 30.5 mm.

As described above, when several collars, each having a different diameter, are used, because the collars often constitute comparatively small parts, they may be easily lost, and, as a result, much care must be taken to manage these collars while not in use. In addition, the replacement of the cutter blades having collars requires much more labor than replacement of blades not requiring collars.

SUMMARY OF THE INVENTION

It is an object of the present invention to overcome the problems of the prior art by providing a cutter blade retaining plate structure in which a plurality of cutter blades with fitting holes, each having a different diameter, may be easily fitted to a drive shaft of a cutter. It is a further object of the present invention to provide such a structure that allows fitting of blades without the need for using prepared collars, requires no labor in replacing the cutter blade, and minimizes the likelihood of loss of collars.

To achieve the above objects, an embodiment of the present invention includes a cutter blade retaining plate structure for use on a drive shaft, characterized in that a first boss portion is formed on a cutter blade retaining plate, whereon a fitting hole of a first cutter blade having a first fitting hole size may be fitted onto the circumferential area of the boss portion on one side of the cutter blade retaining plate; and on the other side of the cutter blade retaining plate, a second boss portion and a movable boss portion are formed for fitting holes of second and third cutter blades, each having a diameter different from that of the first cutter blade. It is a further object of the present invention to preferably include a movable boss portion configured so as to slide freely along the circumferential face of the second boss portion in the direction of an axis line.

Additional objects, advantages and novel features of the invention will be set forth in part in the description that follows, and in part will become more apparent to those skilled in the art upon examination of the following or upon learning by practice of the invention.

DETAILED EXPLANATION OF THE INVENTION

Figure 1:
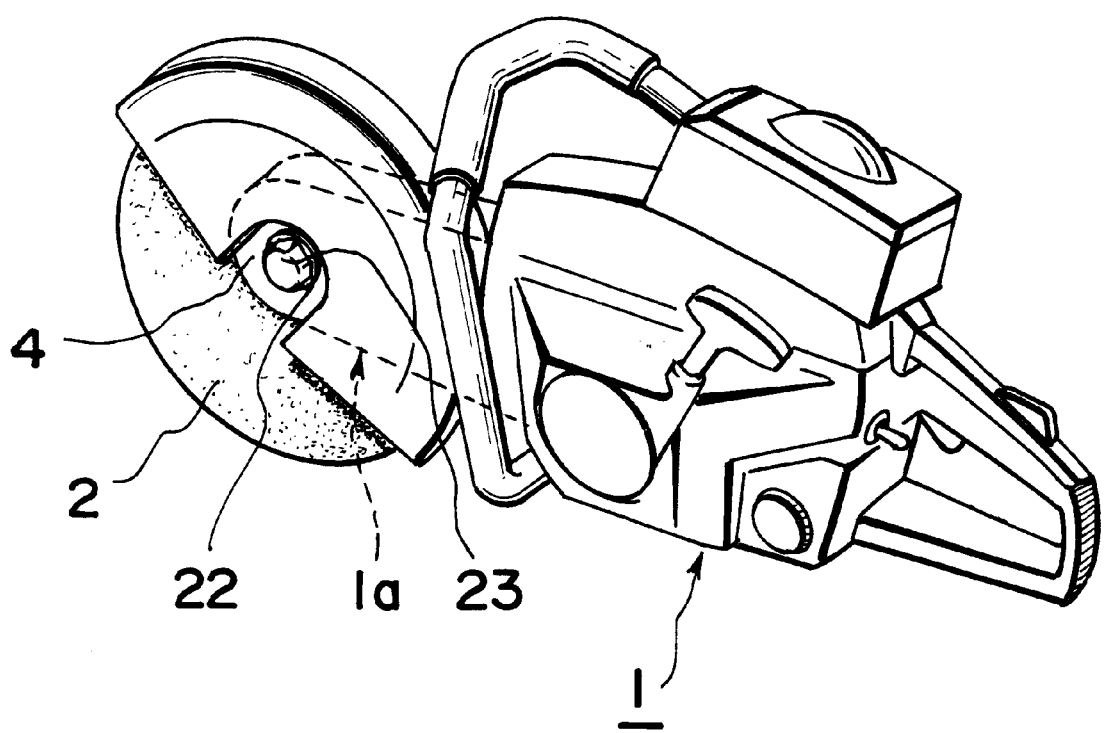
FIG. 1 is a general perspective view of an engine cutter of an embodiment of the present invention.

In an embodiment of the present invention, a cutter blade retaining plate 3 of an engine cutter 1 is paired with an outer cutter blade retaining plate 4, which is used to sandwich and support a cutter blade 7 fitted onto the cutter blade retaining plate 3 by pressing it from the outside. These retaining plates 3, 4 are positioned by fitting them between a ring-shaped recessed groove 3c formed on the cutter blade retaining plate 3 and a boss portion 4a formed on the outer cutter blade retaining plate 4.

The cutter blade retaining plate 3 is constructed in a disc-shaped form as a whole and, on the plate's center area, a fitting hole 6 is formed to be used for connection with a drive shaft 5. The drive shaft 5 is adapted to be rotated by a motor provided within an apparatus body of the engine cutter 1 (see FIG. 1). For use of the fitting hole 6 on the side face 3a of the cutter blade retaining plate 3, a first boss portion 9 is formed to be fitted into a fitting hole 8 of the first cutter blade 7. The diameter of the fitting hole 8 is, for example, 30.5 mm. In the circumferential area of the cutter blade retaining plate 3, a cutter blade pinching portion 10 having a large thickness is provided, the pinching portion being used to support the first cutter blade 7. The cutter blade pinching portion 10 is adapted to be fitted onto the first boss portion 9, together with the outer cutter blade retaining plate 4, each having a planar direction perpendicular to the axis line of the drive shaft 5.

Figure 3:
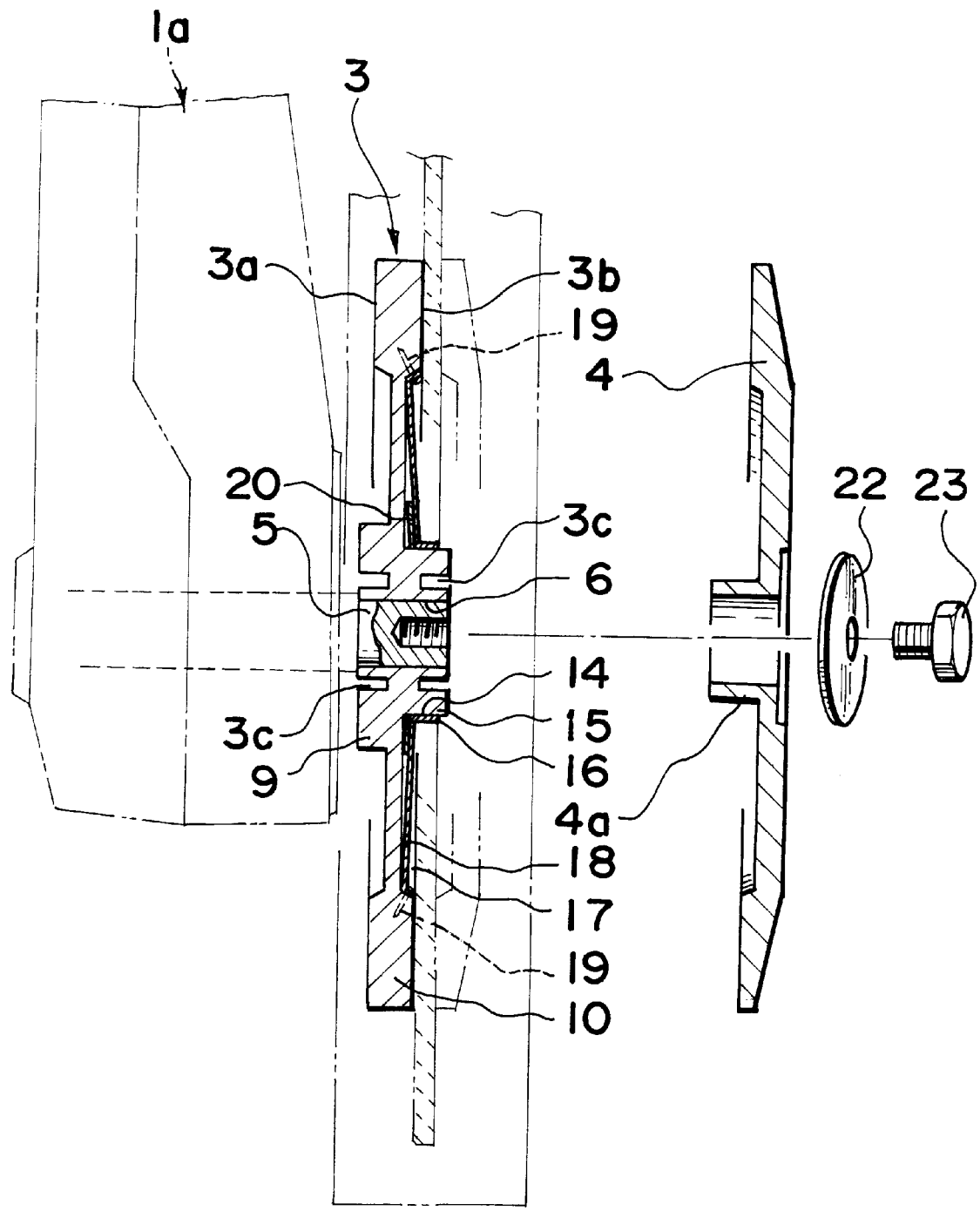
FIG. 3 is a longitudinal sectional view illustrating the third cutter blade in an assembled state according to an embodiment of the present invention.

Formed in the circumferential area of the fitting hole 6 of one side 3b of the cutter blade retaining plate 3 are 1) a second boss portion 15 adapted to be fitted into a fitting hole 13 of a second cutter blade 11 (FIG. 4), the second boss portion 15 having a diameter different from that of the fitting hole 8 of the first cutter blade 7; and 2) a movable boss portion 16 adapted to be fitted into the fitting hole 14 of a third cutter blade 12 (FIG. 3).

For use in accordance with an embodiment of the present invention, the diameter of the fitting hole 13 of the second cutter blade 11 is 25.4 mm and the diameter of the fitting hole 14 of the third cutter blade 12 is 27 mm.

The second boss portion 15 is formed to be adapted so as to fit into the fitting hole 13 of the second cutter blade 11, and the movable boss portion 16 is formed so as to be adapted so as to fit to the fitting hole 14 of the third cutter blade 12.

Moreover, the movable boss portion 16 is configured in such a manner that it is freely slidable in the direction of the axis line of the drive shaft 5, along the circumferential area of the second boss portion 15, so that the moveable boss portion 16 does not interfere when the second cutter blade 11 is being fitted into the second boss portion 15, as described further below.

In an embodiment of the present invention, as shown in the drawings, a doughnut-shaped recessed portion 17 is formed on one side 3b of the cutter blade retaining plate 3, the doughnut-shaped recessed portion 17 being bounded by both the second boss portion 15 and the movable boss portion 16. Within this doughnut recessed portion 17, the movable boss portion 16 is adapted so as to slide along the circumferential face of the second boss portion 15 in the direction of the axis line of the shaft 5, and the moveable boss portion 16 is supported thereby.

In an embodiment of the present invention, the movable boss portion 16 comprises, in an integrated form, a doughnut-shaped collar 18 adapted to be fitted into the doughnut-shaped recessed portion 17, with the circumferential area of the collar 18 fixed to the cutter blade retaining plate 3 by pins 19.

The reference numeral 20 in the drawings identifies a doughnut-shaped wave plate spring, which holds the movable boss portion 16 in an extended position along the side of the outer circumferential area of the second boss portion 15. If, however, the doughnut-shaped collar 18 attached to the movable boss portion 16 is made of an elastic material or materials, such that the movable boss portion 16 extends along the outer circumferential end side of the second boss portion 15, the inclusion of the wave plate spring 20 may not be necessary.

Figure 5:
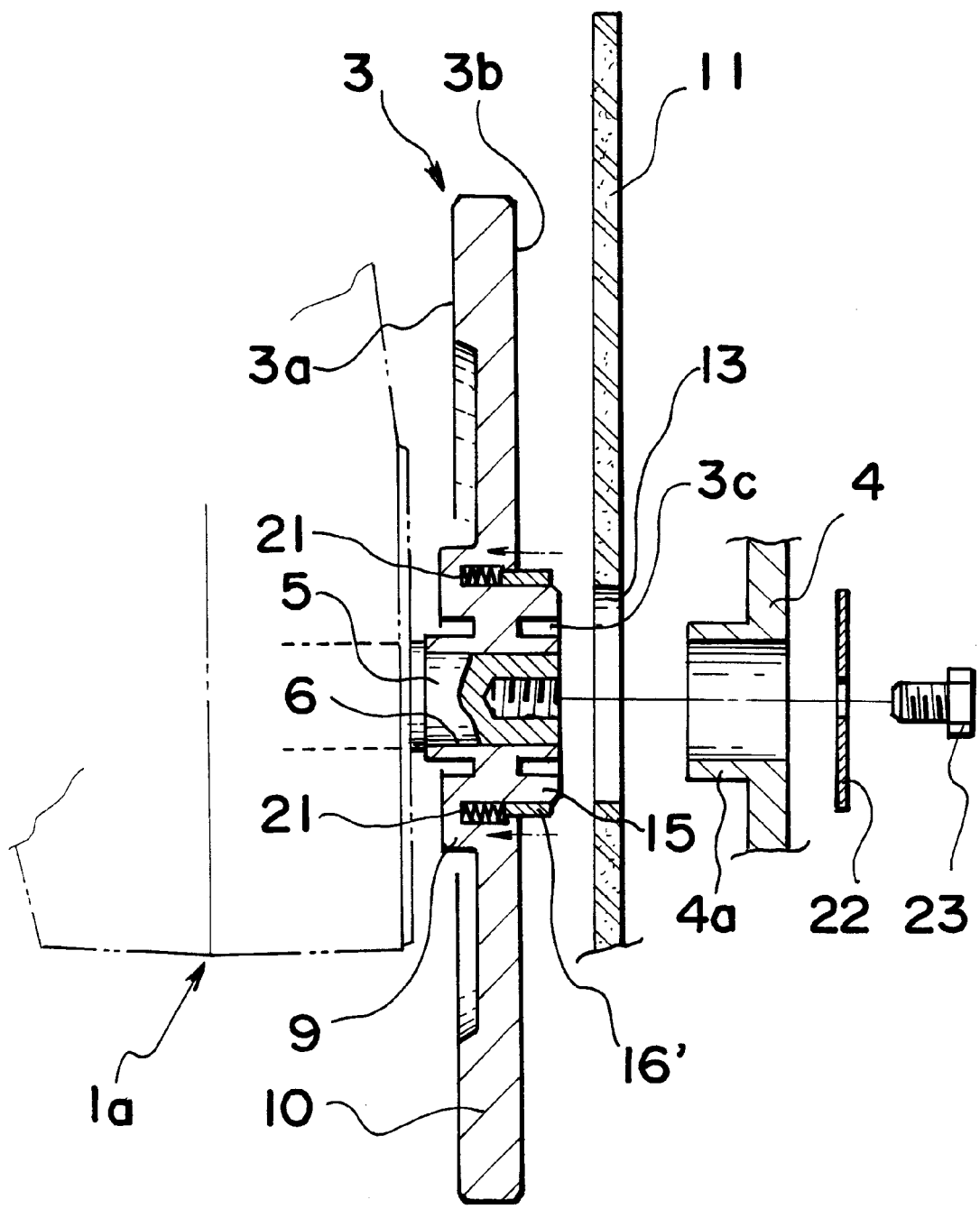
FIG. 5 is a longitudinal sectional view of a movable boss according to another embodiment of the present invention.

FIG. 5 shows a movable boss configured in accordance with another embodiment of the present invention. This embodiment, similar to the embodiment described above, includes in the circumferential area of the second boss portion 15, a movable boss portion 16' that is adapted to slide freely. The movable boss portion 16' slides into a housing of the cutter blade retaining plate up to a distance corresponding to the thickness of the cutter blade retaining plate 3 and is retained in such a manner that the moveable boss portion 16' will not come off. A spring 21, for example, is disposed between the cutter blade retaining plate 3 and the movable boss portion 16', and the movable boss portion 16' is biased by the action of the spring 21 toward the end of the circumferential side of the second boss portion 15.

The movable boss portion 16' is so configured to be housable in the cutter blade retaining plate 3, such that it does not interfere with the second cutter blade 11 when the second cutter blade 11 is being fitted onto the second boss portion 15.

In an alternative embodiment to the movable boss portion 16' described in the above embodiment, a guide pin may be positioned at the same location as the movable boss portion 16', the guide pin being biased to extend along the circumferential end side of the second boss portion 15 and likewise housable in the cutter blade retaining plate 3 whenever the second cutter blade 11 is fitted onto the second boss portion 15. This guide pin may be provided in parallel to the drive shaft 5 at proper points.

In accordance with an embodiment of the present invention, by using the cutter blade retaining plate 3 with the configurations described above, the first cutter blade 7, second cutter blade 11, and third cutter blade 12, each of which has a different diameter fitting hole, may all be easily attached onto the drive shaft 5 of the engine cutter 1.

Figure 2:
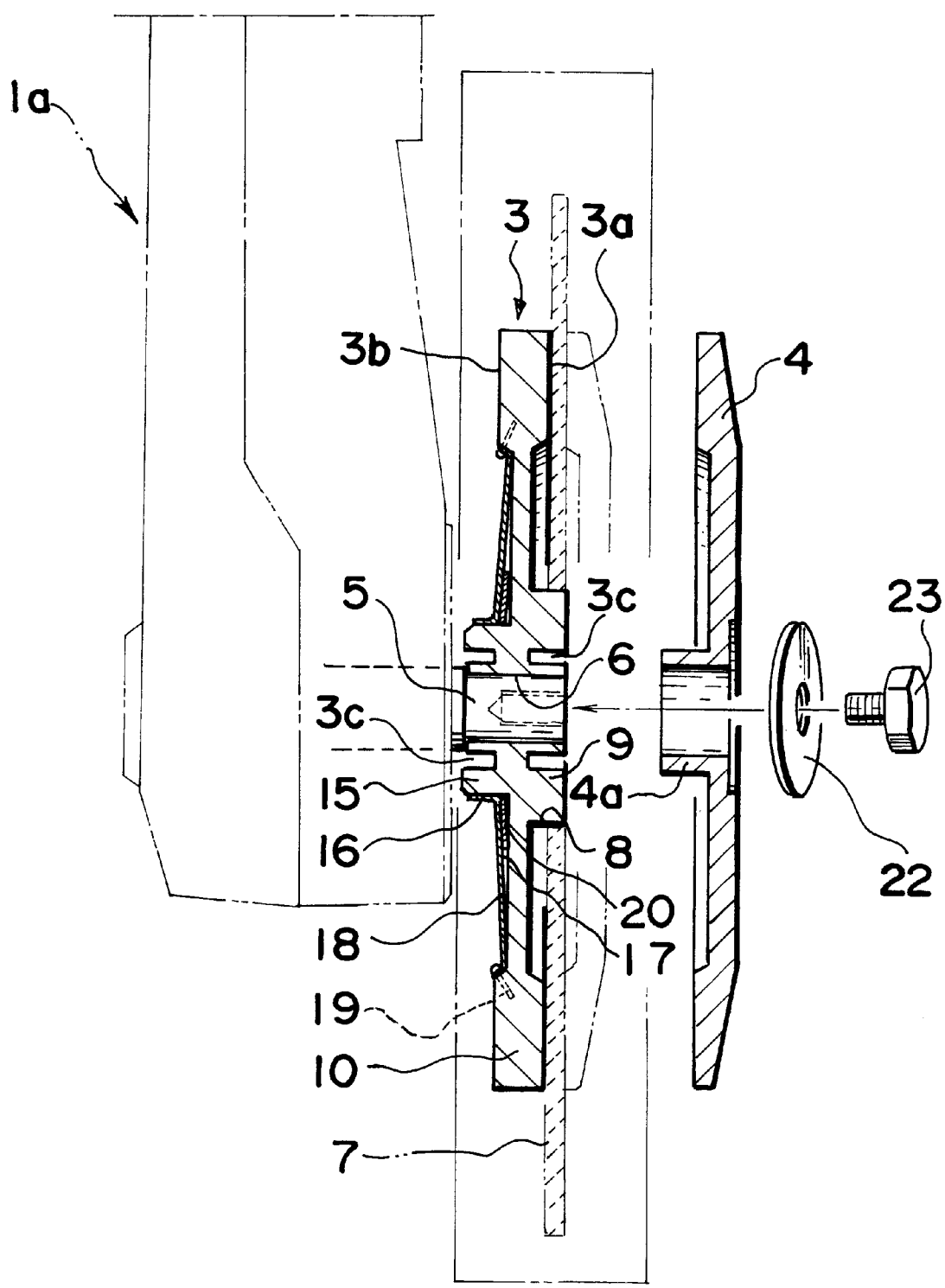
FIG. 2 is a longitudinal sectional view illustrating the first cutter blade in an assembled state according to an embodiment of the present invention.

In accordance with an embodiment of the present invention, the assembled state of the first cutter blade 7, which has a large diameter of 30.5 mm, is shown in FIG. 2. As shown in FIG. 2, the fitting hole 8 of the first cutter blade 7 is fitted to the circumference of the first boss portion 9 formed on one side face 32 of the cutter blade retaining plate 3, and the outer cutter blade retaining plate 4 is put in place, sandwiching the first cutter blade 7 between the cutter blade retaining plate 3 and the outer cutter blade retaining plate 4. A washer 22 is placed between the outer cutter blade retaining plate 4 and a fixing screw 23; and the fixing screw 23, which is adapted to tightenably rotate in a direction opposite to the rotational direction of the first cutter blade 7, is fitted into the female screw hole formed in the drive shaft 5 and tightened.

In accordance with an embodiment of the present invention, the assembled state of the third cutter blade 12, having an intermediate diameter of 27 mm, is shown in FIG. 3. In this case, the cutter blade retaining plate 3, which is reversed from its orientation as shown in FIG. 2, is fitted onto the drive shaft 5. The fitting hole 14 of the third cutter blade 12 is fitted onto the circumference of the movable boss 16 and the outer cutter blade retaining plate 4 is put in place, sandwiching the cutting blade (shown in outline) between the cutter blade retaining plate 3 and the outer cutter blade retaining plate 4. The washer 22 is placed between the outer cutter blade retaining plate 4 and the fixing screw 23, and the fixing screw 23, which is adapted to tightenably rotate in a direction opposite to the rotational direction of the cutter blade, is fitted to the female screw hole formed in the drive shaft 5 and tightened.

Figure 4:
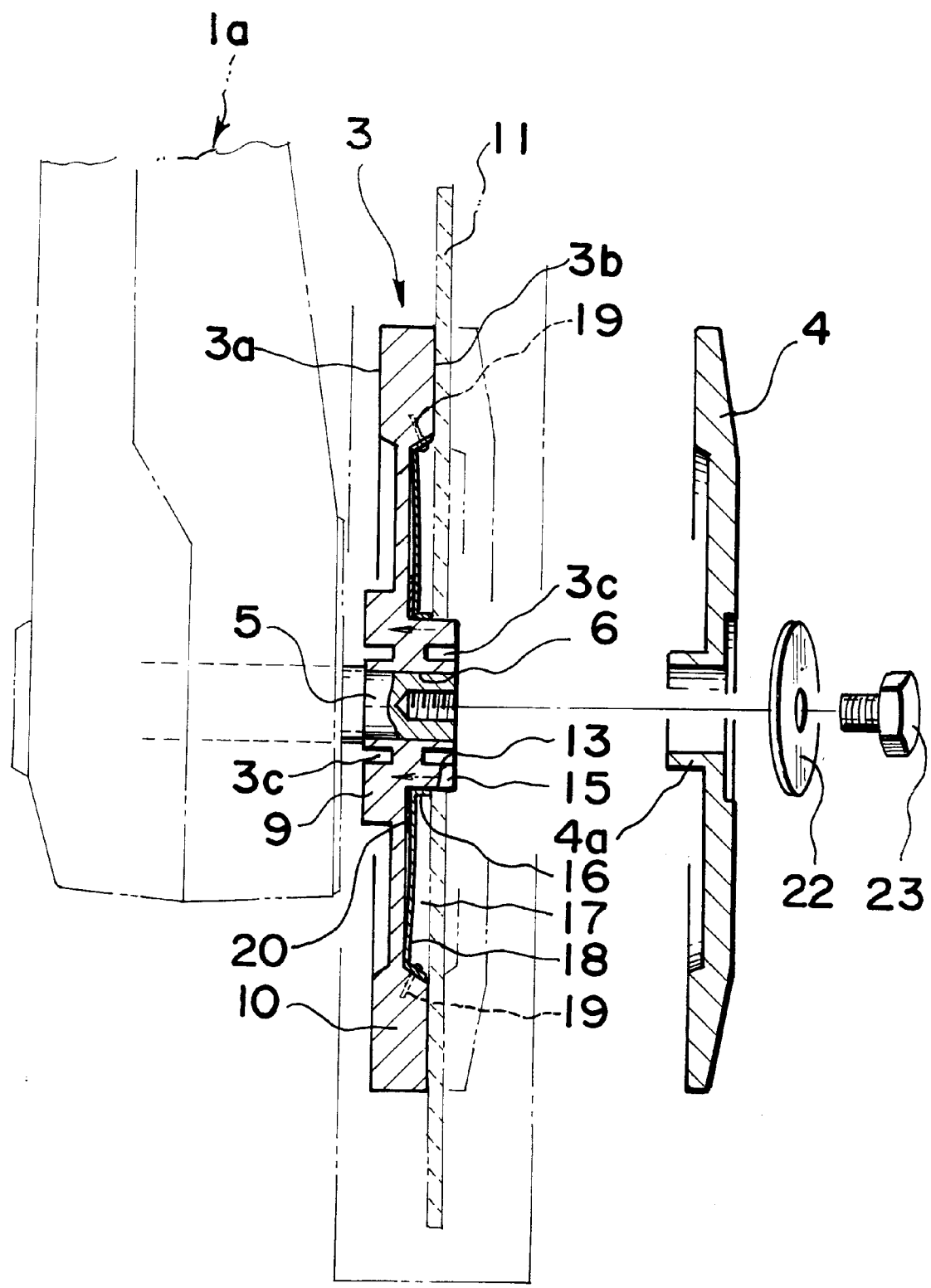
FIG. 4 is a longitudinal sectional view illustrating the second cutter blade in an assembled state according to an embodiment of the present invention.

In accordance with an embodiment of the present invention, the assembled state of the second cutter blade 11 having a small diameter of 25.4 mm is shown in FIG. 4. In this case, as in the case of the attachment of the third cutter blade 12, the cutter blade retaining plate 3, which is reversed from its orientation as shown in FIG. 2, is fitted onto the drive shaft 5. The small fitting hole 13 of the second cutter blade 11 is fitted onto the circumference of second boss portion 15, while the outer end of the movable boss portion 16 is slidably driven by the circumferential edge of the small fitting hole 13 toward the cutter blade retaining plate 3. The outer cutter blade retaining plate 4 is put in place, sandwiching the cutting blade 19 between the cutter blade retaining plate 3 and the outer cutter blade retaining plate 4. The washer 22 is placed between the outer cutter blade retaining plate 4 and the fixing screw 23, and the fixing screw 23, which is adapted to tightenably rotate in a direction opposite to the rotational direction of the cutter blade 11, is fitted onto the female screw hole formed on the drive shaft 5 and tightened.

When second cutter blade 11 is attached to the second boss portion 15, the movable boss 16 is slid along the circumference face of the second boss portion 15, housing the movable boss 16 within the doughnut-shaped recessed portion 17 of the cutter blade retaining plate 3. A similar feature is shown with regard to the movable boss portion 16 presented in FIG. 5.

As described above, by using the cutter blade retaining plate of the present invention, a plurality of cutter blades with fitting holes, each having a different diameter, can be easily attached to the drive shaft of typical engined cutters used for cutting various materials. The present invention may be suitably so used without the need of preparing a plurality of collars and requires no labor to replace the cutter blade. The present invention thereby also overcomes the problem of the prior art of loss of collars.

Embodiments of the present invention have now been described in fulfillment of the above objects. It will be appreciated that these examples are merely illustrative of the invention. Many variations and modifications will be apparent to those skilled in the art.

What is claimed is:

1. A cutter blade retaining plate for use on a drive shaft, the cutter blade retaining plate fittable on the drive shaft via an opening in the center of the cutter blade retaining plate, the opening having an axis, comprising:

a first boss portion formed with a first diameter, whereon a fitting hole of a first cutter blade may be fitted, the first boss portion being located on one side of said cutter blade retaining plate;

a second boss portion formed on a second side of the cutter blade retaining plate and having a second diameter, whereon a fitting hole of a second cutter blade may be fitted;

a moveable boss portion formed on the second side of the cutter blade retaining plate and having a third diameter, whereon a fitting hole of a third cutter blade may be fitted; and wherein the first, second and third diameters of the boss portions are all different sizes and the fitting holes of the first, second and third cutting blades are all different sizes, such that the first fitting hole of the first cutter blade matches the first diameter of the first boss portion, the second fitting hole of the second cutter blade matches the second diameter of the second boss portion and the third fitting hole of the third cutter blade matches the third diameter of the moveable boss portion.

2. The cutting blade retaining plate according to claim 1 wherein said retaining plate is reversible.

3. The cutter blade retaining plate of claim 1, wherein the second boss portion has a circumferential edge, and wherein the movable boss portion is so configured that it is freely slidable along the circumferential edge of second boss portion in the direction of the axis of the cutter blade retaining plate opening.

4. The cutting blade retaining plate according to claim 2 wherein said retaining plate is reversible.

5. A cutting blade retaining plate having a first side and a second side for selectively retaining one from the group consisting of at least a first blade having a first diameter retaining opening, at least a second blade having a second diameter retaining opening, and at least a third blade having a third sized retaining opening, the cutting blade retaining plate comprising:

a first boss portion on the first side, the first boss portion having a diameter for receiving the first blade within the first diameter retaining opening;

a second boss portion on the second side, the second boss portion having a diameter for receiving the second blade within the second blade retaining opening;

a third moveable boss portion on the second side, the third moveable boss portion having an extension for receiving the third blade within the third blade retaining opening;

the third moveable boss portion is slidably moveable between a first position, which allows the third blade to be received on the third moveable boss portion while preventing the second blade from being received on the third moveable boss portion, and a second position, which allows the second blade to be received on the second boss portion;

wherein the diameters of the first boss portion, second boss portion and the third moveable boss portion are all different sizes.

6. The cutting blade retaining plate according to claim 5 wherein said retaining plate is reversible.

* * * * *